US012719186B2

(12) United States Patent
Yang et al.

(10) Patent No.: US 12,719,186 B2
(45) Date of Patent: Aug. 25, 2026

(54) ROBUST ELECTRICAL CONNECTOR

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 392 days.

(21) Appl. No.: 18/505,468

(22) Filed: Nov. 9, 2023

(65) Prior Publication Data

US 2024/0162638 A1 May 16, 2024

(30) Foreign Application Priority Data

Nov. 10, 2022 (CN) ......................... 202211403700.6
Nov. 10, 2022 (CN) ......................... 202222990059.2

(51) Int. Cl.
*H01R 12/70* (2011.01)
*H01R 12/72* (2011.01)

(52) U.S. Cl.
CPC ....... *H01R 12/7023* (2013.01); *H01R 12/721* (2013.01)

(58) Field of Classification Search
CPC .......................... H01R 12/7023; H01R 12/721
USPC ................................................. 439/325, 327
See application file for complete search history.

(56) References Cited

U.S. PATENT DOCUMENTS 6,168,450 B1 * 1/2001 Davis ................. H01R 12/7076 439/325
7,074,067 B2 7/2006 Yang et al.
7,438,569 B2 * 10/2008 Pennypacker ..... H01R 13/6335 439/157

(Continued)

FOREIGN PATENT DOCUMENTS

CN 202633554 U 12/2012
CN 203660106 U 6/2014

(Continued)

OTHER PUBLICATIONS

U.S. Appl. No. 17/331,414, filed May 26, 2021, Hu et al.

(Continued)

*Primary Examiner* — Tulsidas C Patel
*Assistant Examiner* — Jeffrey Mountain
(74) *Attorney, Agent, or Firm* — Wolf, Greenfield & Sacks, P.C.

(57) ABSTRACT

A robust electrical connector is provided. The connector includes a housing body, conductive elements held by the housing body, and a slot extending in the housing body and configured to receive a mating component. The housing body has a mating face and a mounting face opposite the mating face. The conductive elements include mating portions curving into the slot and configured to mate with the mating component, and mounting portions extending out of the mounting face. The connector includes a tower extending from an end of the housing body, and a latch pivotably connected to the tower so as to secure the mating component in the slot at a locked position. The tower includes a base portion extending from an end of the housing body, and a cover portion disposed on the base portion. Such a configuration reduces the risk that the tower cracks during operation.

20 Claims, 12 Drawing Sheets

(56) References Cited

U.S. PATENT DOCUMENTS

| | | | |
|---|---|---|---|
| 7,607,949 B2 | 10/2009 | Hsu | |
| 7,637,783 B2 | 12/2009 | Sasaoka et al. | |
| 7,677,907 B2 | 3/2010 | Guan et al. | |
| 7,731,541 B1 | 6/2010 | Lee et al. | |
| 7,892,006 B2 | 2/2011 | Guan et al. | |
| 7,972,171 B2 | 7/2011 | Teh | |
| 8,025,507 B2 | 9/2011 | Kim et al. | |
| 8,142,207 B1 | 3/2012 | Ljubijankic et al. | |
| 8,187,031 B2 | 5/2012 | Li et al. | |
| 8,403,689 B2 | 3/2013 | Li et al. | |
| 8,535,077 B2 | 9/2013 | Shen et al. | |
| 8,721,350 B2 | 5/2014 | Liu et al. | |
| 9,166,317 B2 | 10/2015 | Briant et al. | |
| 9,325,090 B2 | 4/2016 | Shen et al. | |
| 9,431,734 B2 | 8/2016 | Guo et al. | |
| 9,685,723 B2 | 6/2017 | Kee Mew | |
| 9,887,485 B2 | 2/2018 | Lambie et al. | |
| 10,103,476 B1 | 10/2018 | Qiu et al. | |
| 10,135,165 B2 | 11/2018 | Zuo | |
| 10,224,653 B2 | 3/2019 | Niu et al. | |
| 10,461,467 B2 | 10/2019 | Eppley et al. | |
| 10,741,944 B2 | 8/2020 | Long | |
| 10,855,020 B1 | 12/2020 | Phillips et al. | |
| 10,916,894 B2 | 2/2021 | Kirk et al. | |
| 11,374,340 B2 | 6/2022 | Tang | |
| 11,545,769 B2 | 1/2023 | Comerci et al. | |
| 11,637,391 B2 | 4/2023 | Guo et al. | |
| 11,710,923 B2 | 7/2023 | Hu et al. | |
| 11,817,639 B2 | 11/2023 | Yi et al. | |
| 2007/0238323 A1* | 10/2007 | Mathews | H01R 13/6275 439/65 |
| 2010/0075538 A1 | 3/2010 | Ohshida | |
| 2011/0021080 A1 | 1/2011 | Kamiya et al. | |
| 2011/0065297 A1 | 3/2011 | Guan et al. | |
| 2011/0136388 A1 | 6/2011 | Fu et al. | |
| 2011/0275238 A1 | 11/2011 | Iijima et al. | |
| 2012/0178274 A1 | 7/2012 | Manickam | |
| 2012/0202387 A1 | 8/2012 | McNamara | |
| 2013/0280926 A1 | 10/2013 | Ono | |
| 2014/0179167 A1* | 6/2014 | Long | H01R 12/737 439/630 |
| 2016/0020540 A1 | 1/2016 | Shen et al. | |
| 2016/0118736 A1 | 4/2016 | Hoyack et al. | |
| 2016/0190724 A1 | 6/2016 | Mito | |
| 2016/0336667 A1 | 11/2016 | Kee Mew | |
| 2017/0302031 A1 | 10/2017 | Cheng et al. | |
| 2018/0198220 A1 | 7/2018 | Sasame et al. | |
| 2019/0165518 A1 | 5/2019 | Hsu et al. | |
| 2019/0173209 A1 | 6/2019 | Lu et al. | |
| 2019/0173232 A1 | 6/2019 | Lu et al. | |
| 2019/0199023 A1 | 6/2019 | Soh | |
| 2020/0076131 A1 | 3/2020 | Hu et al. | |
| 2020/0076135 A1 | 3/2020 | Tang et al. | |
| 2020/0194921 A1* | 6/2020 | Eng-Kan | H01R 13/6273 |
| 2020/0203867 A1 | 6/2020 | Lu | |
| 2021/0288423 A1 | 9/2021 | Guo et al. | |
| 2021/0351529 A1 | 11/2021 | Yang et al. | |
| 2021/0376508 A1 | 12/2021 | Hu | |
| 2022/0037828 A1 | 2/2022 | Hu et al. | |
| 2022/0069496 A1 | 3/2022 | Yi et al. | |
| 2022/0181809 A1 | 6/2022 | Xie et al. | |
| 2022/0181811 A1 | 6/2022 | Liu et al. | |
| 2022/0247107 A1 | 8/2022 | Tang et al. | |
| 2023/0096092 A1 | 3/2023 | Hu | |
| 2023/0126150 A1 | 4/2023 | Yang et al. | |
| 2023/0163500 A1 | 5/2023 | Yang et al. | |
| 2023/0178916 A1 | 6/2023 | Yang et al. | |
| 2023/0238724 A1 | 7/2023 | Yang et al. | |
| 2023/0335931 A1 | 10/2023 | He et al. | |
| 2024/0014585 A1 | 1/2024 | Yang et al. | |
| 2024/0014596 A1 | 1/2024 | Yang et al. | |

FOREIGN PATENT DOCUMENTS

| | | | |
|---|---|---|---|
| CN | 105703103 | A | 6/2016 |
| CN | 108539464 | A | 9/2018 |
| CN | 212874843 | U | 4/2021 |
| CN | 214505858 | U | 10/2021 |
| GB | 227942 | A | 1/1925 |
| TW | M475740 | U | 4/2014 |
| WO | WO 02/073819 | A2 | 9/2002 |

OTHER PUBLICATIONS

U.S. Appl. No. 17/540,062, filed Dec. 1, 2021, Liu et al.
U.S. Appl. No. 17/950,364, filed Sep. 22, 2022, Hu.
U.S. Appl. No. 17/973,913, filed Oct. 26, 2022, Yang et al.
U.S. Appl. No. 17/988,330, filed Nov. 16, 2022, Yang et al.
U.S. Appl. No. 18/075,246, filed Dec. 5, 2022, Yang et al.
U.S. Appl. No. 18/101,998, filed Jan. 26, 2023, Yang et al.
U.S. Appl. No. 18/133,601, filed Apr. 12, 2023, He et al.
U.S. Appl. No. 18/346,150, filed Jun. 30, 2023, Yang et al.
U.S. Appl. No. 18/346,155, filed Jun. 30, 2023, Yang et al.
U.S. Appl. No. 18/453,448, filed Aug. 22, 2023, Yang et al.
U.S. Appl. No. 18/453,504, filed Aug. 22, 2023, Yang et al.
[No Author Listed], Amphenol Information Communications and Commerical Products. Amphenol ICC Storage & Server IO. 2023, 10 pages. URL:https://cdn.amphenol-cs.com/media/wysiwyg/files/documentation/customerpresentation/ddr4_product_presentation.pdf [retrieved on Dec. 19, 2023].
[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].
[No Author Listed], DDR5 SDRAM—Wikipedia. Aug. 8, 2021. 6 pages. URL:https://en.wikipedia.org/wiki/DDR5_SDRAM [last accessed on Aug. 16, 2021].
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].
Armasu, What We Know About DDR5 So Far. Jun. 7, 2019. 20 pages. URL:https://www.tomshardware.com/news/what-we-know-ddr5-ram,39079.html [last accessed Jul. 21, 2022].
Yang et al., Card Edge Connector With Reduced Height, U.S. Appl. No. 18/453,448, filed Aug. 22, 2023.
Yang et al., Surface Mount Card Edge Connector and Compact Electronic System Therewith, U.S. Appl. No. 18/453,504, filed Aug. 22, 2023.

* cited by examiner

ROBUST ELECTRICAL CONNECTOR

RELATED APPLICATIONS

This application claims priority to and the benefit of Chinese Patent Application Serial Nos. 202222990059.2 and 202211403700.6, both filed on Nov. 10, 2022. The contents of these applications are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as several printed circuit boards (PCB) which may be joined together with electrical connectors than to manufacture the system as a single assembly. A known arrangement for joining several PCBs may have one printed circuit board as a mainboard. In servers and other powerful computers, cards may be electrically connected to the mainboard via electrical connectors mounted on the mainboard.

Card edge connectors have been used in electronic products, such as computers, which can be used to connect an electronic card, such as memory card, graphics card, sound card and so on, to a mainboard, so that the card provides relevant functions for the electronic products, such as expanding capacities, and/or enhancing running rate of the electronic products and other related performances thereof.

Card edge connectors may have pivotable latches, and the latches may be pivoted to unlocked positions when the electronic cards are expected to be inserted into or pulled out from the card edge connectors. As the electronic cards are inserted into the card edge connectors, the latches may pivot to locked positions where the electronic cards are locked to the card edge connectors.

Card edge connectors of this type may be configured, for example, to receive an add-in card for a computer that contains memory chips. Such memory cards may be implemented according to a standard, such as DDR4 or DDR5. Certain aspects of the card edge connector would then also comply with the standard, such as the length and width of a slot that receives the card or the position of the head of the latch relative to the slot.

BRIEF SUMMARY

Aspects of the present application relate to robust electrical connectors.

Some embodiments relate to an electrical connector. The electrical connector may include a housing comprising a body having a mating face and a mounting face opposite the mating face, a base portion extending from an end of the body, a first portion of a slot extending in the body from the mating face toward the mounting face, and a second portion of the slot extending in the base portion; and a cover portion disposed on the base portion of the housing. The slot may comprise a third portion extends in the cover portion, and the second portion of the slot may connect the first portion and the second portion.

Optionally, the electrical connector may include a latch pivotably connected to the base portion of the housing between a locked position and an unlocked position.

Optionally, the cover portion may be at least partially surrounded by the base portion of the housing and the latch when the latch may be in the locked position.

Optionally, the cover portion may comprise a restraining feature configured to engage the latch when the latch is in the locked position.

Optionally, the latch may comprise a hole extending therethrough; and the restraining feature of the cover portion may comprise a protrusion configured to extend into the hole of the latch when the latch is in the locked position.

Optionally, the restraining feature of the cover portion may comprise a first tab and a second tab extending from opposite sides of the cover portion and away from the third portion of the slot; and the latch may be disposed between the first tab and the second tab when the latch is in the locked position.

Optionally, the base portion of the housing may comprise a first hole and a second hole disposed on opposite sides of the second portion of the slot; and the cover portion may comprise a first post and a second post extending from opposite sides of the third portion of the slot, the first post extending into the first hole, and the second post extending into the second hole.

Optionally, the electrical connector may include a plurality of conductive elements, each of the plurality of conductive elements comprising a mating portion curving into the first portion of the slot and a mounting portion extending out of the mounting face of the housing.

Some embodiments relate to an electrical connector. The electrical connector may include a housing body comprising a mating face and a mounting face opposite the mating face; a slot extending in the housing body; a plurality of conductive elements held by the housing body, each of the plurality of conductive elements comprising a mating portion curving into the slot and a mounting portion extending out of the mounting face; and a tower extending from an end of the housing body, the tower comprising a base portion having a surface and a cover portion engaging the surface of the base portion.

Optionally, the slot may extend from the housing body through the base portion of the tower to the cover portion of the tower.

Optionally, the electrical connector may include a latch pivotably connected to the base portion of the tower between a locked position and an unlocked position, the latch comprising a head portion configured to engage a card inserted into the slot when the latch is in the locked position, and a tail portion opposite the head portion and configured to move toward the mating face when the latch pivots from the locked position to the unlocked position. The cover portion of the tower may be disposed between the head portion of the latch and the base portion of the tower.

Optionally, the base portion of the tower may comprise a cavity; and the latch may comprise an intermediate portion joining the head portion and the tail portion and configured to be disposed in the cavity of the base portion of the tower when the latch is in the locked position.

Optionally, the base portion of the tower may comprise a recess extending into a wall of the cavity and up to the surface that the cover portion engages; and the intermediate portion of the latch may comprise a protrusion configured to extend into the recess when the latch is in the locked position.

Optionally, the base portion of the tower may comprise a hole extending from the surface that the cover portion engages toward the housing body; and the cover portion of the tower may comprise a post extending into the hole of the base portion of the tower.

Optionally, the post of the cover portion of the tower may comprise a ring-shaped protrusion, a guide portion tapering from the ring-shaped protrusion to a distal end, and a reduced portion separated from the guide portion by the ring-shaped protrusion.

Some embodiments relate to a method of manufacturing an electrical connector. The method may include forming a housing comprising a body having a mating face and a mounting face opposite the mating face, a base portion extending from an end of the body, a first portion of a slot extending in the body from the mating face toward the mounting face, and a second portion of the slot extending in the base portion; forming, separately from forming the housing, a cover portion comprising a third portion of the slot; and disposing the cover portion on the base portion of the housing.

Optionally, forming the housing may comprise molding the housing with an insulative material.

Optionally, forming the cover portion may comprise molding the cover portion with the insulative material.

Optionally, the cover portion may be formed with a material different from the insulative material.

Optionally, the material of the cover portion may have a higher mechanical strength than the insulative material.

Some embodiments relate to an electrical connector. The electrical connector may include an insulating housing and a cover portion. The insulating housing may include a body extending along a longitudinal direction and a base portion extending from an end part of the body along a vertical direction perpendicular to the longitudinal direction. A slot for receiving an edge of a card may extend from the body into the base portion. The cover portion and the insulating housing may be separated pieces. The cover portion may be connected to the base portion, and the slot may extend to the cover portion.

Optionally, the electrical connector further may comprise a latch, wherein the latch may be pivotably connected to the base portion between a locked position and an unlocked position.

Optionally, the cover portion may be within a space at least partially surrounded by the latch in the locked position and the base portion.

Optionally, the cover portion may be provided with a restraining feature, wherein the restraining feature, along a transverse direction, engages the latch when the latch is in the locked position. The transverse direction may be perpendicular to the longitudinal direction and the vertical direction.

Optionally, the restraining feature includes a restraining protrusion protruding outward from an intermediate portion of the cover portion along the longitudinal direction. The latch may be provided with a heat dissipation hole penetrating along the longitudinal direction, wherein the restraining protrusion engages the heat dissipation hole along the transverse direction when the latch is in the locked position.

Optionally, the restraining feature may include a first tab and a second tab extending outward from opposite sides of the cover portion along the longitudinal direction, wherein the first tab and the second tab clamp the latch therebetween along the transverse direction when the latch is in the locked position.

Optionally, a cavity may be provided on a portion of the base portion far away from the body. The cover portion may be connected to a portion of the base portion close to the body. The lower portion of the latch may be accommodated in the cavity and the upper portion abuts against the cover portion when the latch is in the locked position.

Optionally, a recess may be provided on an inner side wall of the cavity, and a locking protrusion may be provided on opposite sides of the latch. The locking protrusion engages the recess when the latch is in the locked position.

Optionally, the cover portion may be connected to a connecting surface of the base portion. The connecting surface may be perpendicular to the vertical direction, and the recess may extend to the connecting surface.

Optionally, the base portion and the cover portion may be disposed sequentially away from the body along the vertical direction.

Optionally, a first post and a second post may be provided on the cover portion respectively disposed on opposite sides of the slot. A first hole and a second hole are provided on the base portion respectively disposed on opposite sides of the slot. The first post engages the first hole, and the second post engages the second hole.

Optionally, the insulating housing may be an injection molded piece.

Optionally, the cover portion may be an injection molded piece.

Optionally, the mechanical strength of the cover portion may be equal to or higher than that of the insulating housing.

Optionally, the cover portion may be made from one or more of: metal, ceramics, polycarbonate, acrylonitrile-butadiene-styrene and liquid crystal polymer.

Optionally, the insulating housing may be a separate injection molded piece, and no weld line caused by injection molding may be formed on the base portion and on a intermediate portion of the slot.

Optionally, the electrical connector further may comprise a plurality of conductive elements. Each of the plurality of conductive elements includes a mating portion bending into the slot and a mounting portion extending out of the insulating housing.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
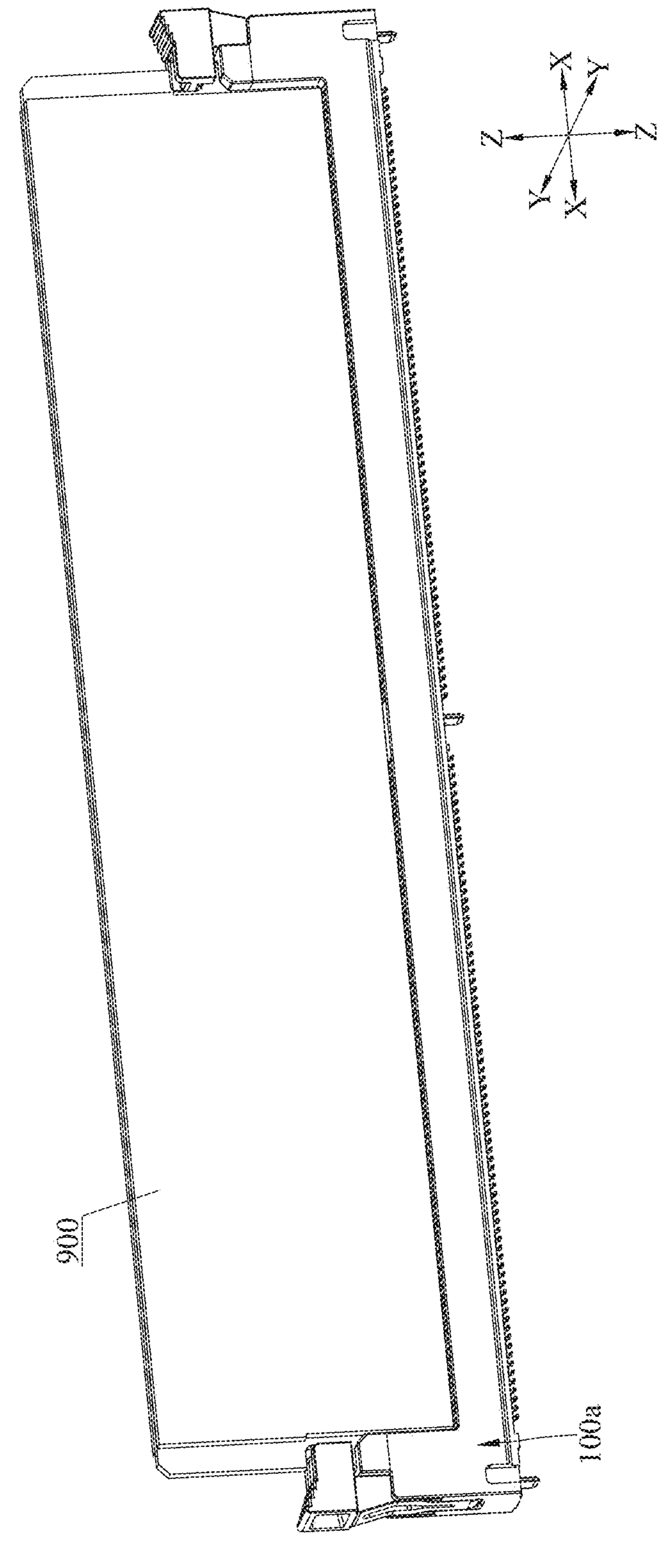
FIG. 1 is a perspective view of an electronic system including an electrical connector with a card, according to some embodiments.

The drawings include the following reference numerals: 100*a*, 100*b*, 100*c*, electrical connector; 200, insulating housing; 201, mating face; 202, mounting face; 203, pivot hole; 210, slot; 211, first portion; 212, second portion; 212*a*, first side portion; 212*b*, second side portion; 212*c*, intermediate portion; 213, third portion; 213*a*, first side portion; 213*b*, second side portion; 213*c*, intermediate portion; 230, body; 250, tower; 270, base portion; 271, cavity; 273, recess; 275, connecting surface; 277, first hole; 279, second hole; 290*a*, 290*b*, 290*c*, cover portion; 291, restraining protrusion; 293, first tab; 295, second tab; 297, first post; 297*a*, ring-shaped protrusion; 297*b*, reduced portion; 299, second post; 300, conductive element; 310, mating portion; 320, mounting portion; 400, latch; 410, head portion; 430, tail portion; 450, locking protrusion; 470, heat dissipation hole; 490, pivot; 500, weld line; 900, card.

DETAILED DESCRIPTION

The inventors have recognized and appreciated connector design techniques that enable robust connectors with reduced risks of cracking during operation. Electrical connectors, such as DDR5 (Double-Data-Rate at generation 5) connectors, may be used in electronic systems to interconnect electronic boards (e.g., graphic cards, memory cards, etc.). For example, DIMMs (Dual-Inline-Memory-Module) may be used in computers and connected to a mainboard of a computer via, e.g., card edge connectors. The card edge connectors may be fixed to the mainboard, and conductive elements of the card edge connectors may be interconnected with circuits on the mainboard. DIMMs can be inserted into the card edge connectors so that conductive pads, sometimes called "golden fingers," of the DIMMs are electrically connected with the conductive elements of the card edge connectors, thereby interconnecting the golden fingers on the DIMMs with the circuit on the mainboard.

The inventors have recognized and appreciated that, because of the process used to form a connector housing (e.g., injection molding), weld lines are often formed after cooling at thin portions bounding a slot of the connector configured for receiving an edge of a card. The weld lines are the result of molding material (such as thermoplastic) flowing into the section of a mold that forms those thin portions from different directions. The connector housing may be more prone to crack at these weld lines, which may therefore reduce the mechanical strength of the thin portions of the connector housing. For example, the connector housing may experience forces when the connector operates under vibration and/or other conditions, such as when a user inserts a card into the slot of the connector or removes a card from the slot of the connector. Under such conditions, the connector tends to crack at the weld lines due to these forces. The cracks in the connector housing may make the connector unrealibale and even unusable.

The inventors have recognized and appreciated that the connectors may be more robust and reliable by enhancing the mechanical strength of the connector housing at these weldlines. In some embodiments, a connector housing may include a body and a tower extending from an end of the body along a vertical direction. The tower may include a base portion and a cover portion disposed on the base portion. A slot configured to receive a mating component (e.g., a card, a plug connector) may extend from the body of the housing through the base portion of the tower to the cover portion of the tower. The base portion of the tower may be integrally formed with the body of the connector housing. The cover portion may be formed separately and assembled onto the base portion of the tower. Optionally, the cover portion may be formed of a material that has a higher mechanical strength than the base portion. Such a configuration can reduce the risk of having weld lines at the thin portions of the tower and thus the risk that the tower cracks during operation, resulting in connectors with improved mechanical strengths.

An example of electrical connectors according to some embodiments are described below in connection with the drawings.

A vertical direction Z-Z, a longitudinal direction X-X and a transverse direction Y-Y described herein may be perpendicular to each other. The vertical direction Z-Z may refer to a height direction of the electrical connector. The longitudinal direction X-X may refer to a length direction of the electrical connector. The transverse direction Y-Y may refer to a width direction of the electrical connector.

As shown in FIGS. 1-4, a electrical connector 100*a* may comprise an insulating housing 200 and a cover portion 290*a*.

The insulating housing 200 may be molded with insulating materials, such as plastics. Plastics may include liquid crystal polymers (LCP), polyphenylene sulfite (PPS), high-temperature nylon or poly-p-phenylene oxide (PPO), or polypropylene (PP), or any other suitable materials. In some embodiments, plastics may be thermosetting plastics. In some embodiments, insulating plastics may include such as a fiberglass-reinforced insulating material. The insulating housing 200 may be an integrated piece. For example, the insulating housing 200 may be an injection molded piece. The insulating housing 200 may have a mating face 201 and a mounting face 202. The electrical connector 100*a* as shown in the drawings is a vertical connector and the mating face 201 and the mounting face 202 may be disposed opposite in a vertical direction Z-Z. In some embodiments, the electrical connector may be a right-angle connector with its mating face and mounting face perpendicular to each other. For example, the mounting face is perpendicular to the vertical direction Z-Z and the mating face is perpendicular to a transverse direction Y-Y. Despite the type that the electrical connector 100*a* is configured with, the mating face 201 may be configured to face a mating component (e.g., a card) and the mounting face 202 may be configured to face a mounting component (e.g., a motherboard).

A slot 210 extending along a longitudinal direction X-X may be provided on the mating face 201. The slot 210 may recess from the mating face 201 in the vertical direction Z-Z and configured to receive an edge of a card 900. The edge of the card 900 may be inserted into the slot 210.

The insulating housing 200 may include a body 230 and a base portion 270. The body 230 may extend along the longitudinal direction X-X. The base portion 270 may be connected to an end of the body 230. The base portion 270 may extend in the vertical direction Z-Z. The base portion

270 may protrude out of the body 230 from the end of the body 230 in the vertical direction Z-Z. The slot 210 may extend from the body 230 into the base portion 270. As illustrated, the slot 210 may include a first portion 211 and a second portion 212 interconnected with each other. The first portion 211 may extend in the body 230. The second portion 212 may extend in the base portion 270.

Figure 3:
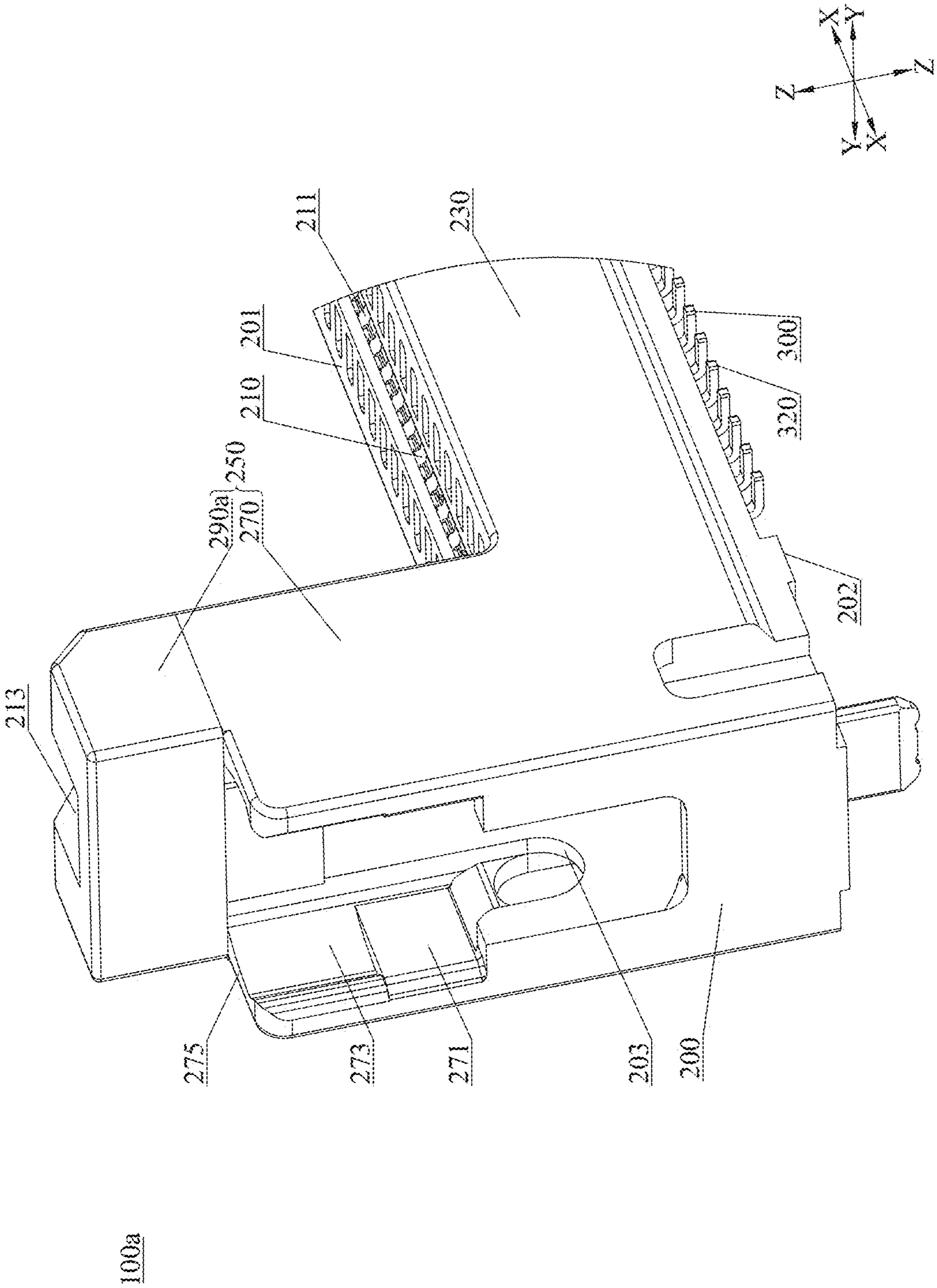
FIG. 3 is a partial perspective view of the electrical connector of FIG. 2, with a latch hidden.
Figure 4:
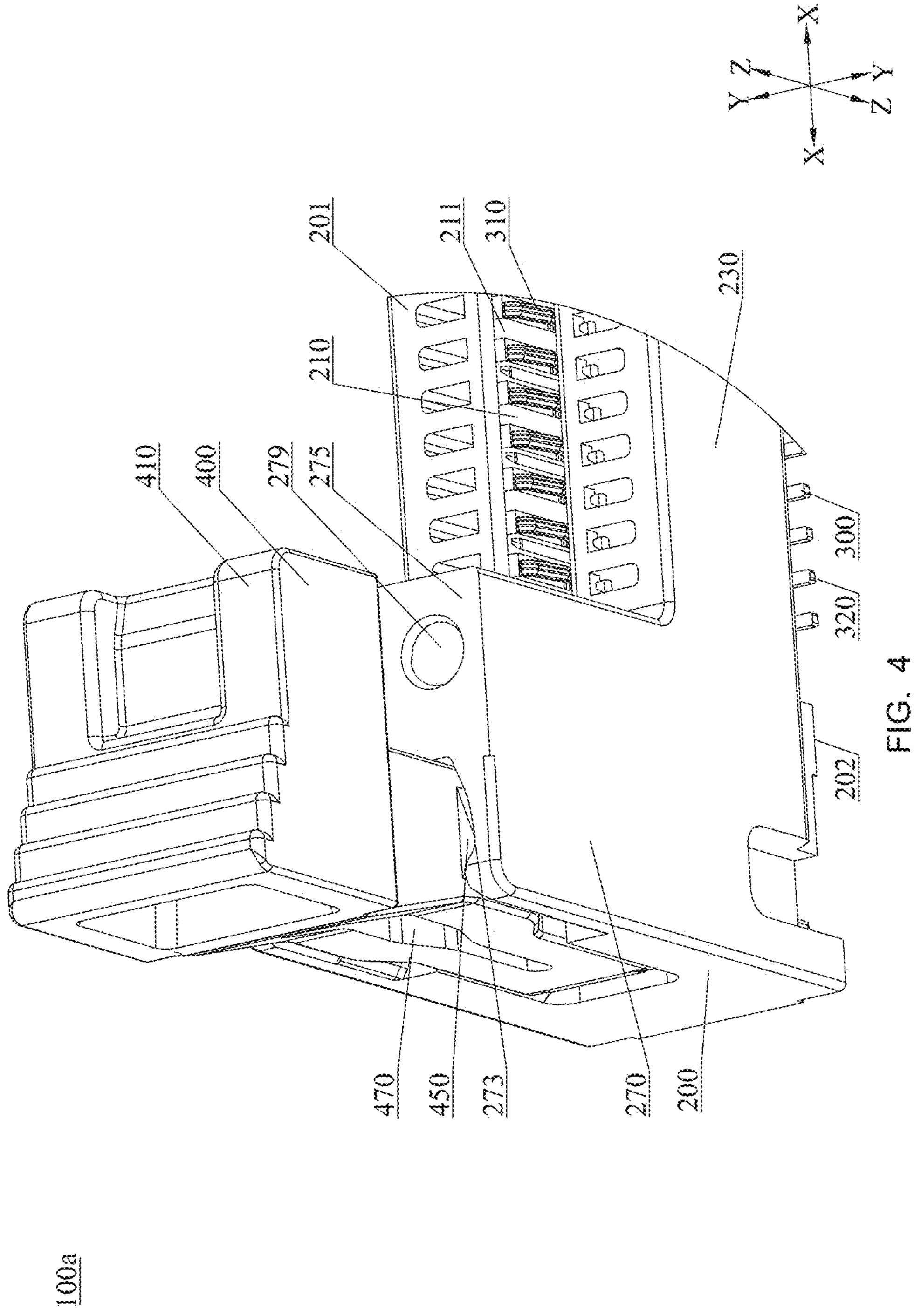
FIG. 4 is a partial perspective view of the electrical connector of FIG. 2, with a cover portion hidden.

As shown in FIGS. 3-4, the electrical connector 100*a* may comprise a plurality of conductive elements 300. The adjacent conductive elements 300 may be spaced apart such that the adjacent conductive elements 300 are electrically insulated from each other. The conductive elements 300 may be made of conductive materials, such as metal. Each conductive element 300 may be an elongated integrated piece. The conductive elements 300 may extend into the slot 210. As illustrated, each conductive element 300 may include a mating portion 310 at its front end and a mounting portion 320 at its rear end. The mating portion 310 may be disposed within the insulating housing 200. The mating portion 310 may be disposed on the side of the slot 210. As illustrated, the mating portion 310 may curve into the slot 210. The mounting portion 320 may extend out of the insulating housing 200. As illustrated, the mounting portion 320 may extend beyond the mounting face 202. The mounting portion 320 may be connected to the mainboard with surface mounting technology (SMT) and/or through-hole technology (THT) and so on. Thus, the electrical connector 100*a* may electrically connect with a circuit board.

The mating portions 310 of the conductive elements 300 may be arranged in two rows on opposite sides of the slot 210 in the transverse direction Y-Y, with each row extending along the longitudinal direction X-X. Optionally, the two rows of conductive elements 300 may be aligned with each other in the longitudinal direction X-X. Optionally, the two rows of conductive elements 300 may be staggered in the longitudinal direction X-X to increase the space between the conductive elements 300 to reduce crosstalk. Optionally, the conductive elements 300 may also be disposed on one side of the slot 210.

In some embodiments, when the edge of the card is inserted into the slot 210, the golden fingers of the card 900 may electrically contact the mating portions 310. The mounting portions 320 may be mounted to a pad on the circuit board by, for example, soldering, to electrically connect with the circuit of the mainboard. Thus, the electrical connector 100*a* can realize interconnection of the card 900 with the circuit on the mainboard.

The cover portion 290*a* and the insulating housing 200 may be separated pieces. For example, the cover portion 290*a* and the insulating housing 200 may be manufactured separately. Exemplarily, the cover portion 290*a* may also be an injection molded piece. In this way, it is easier to achieve a complex structure of the cover portion 290*a*.

Figure 5:
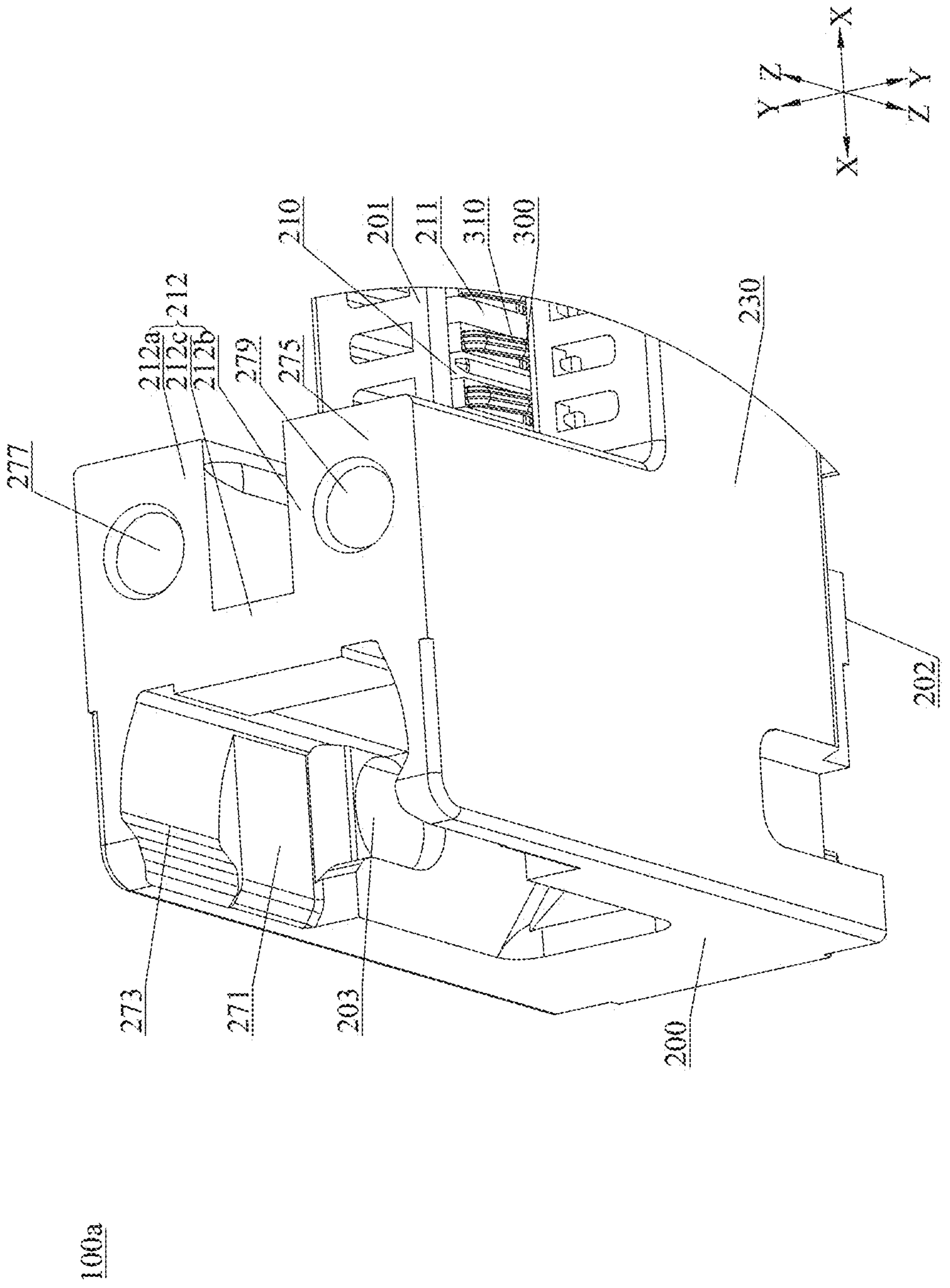
FIG. 5 is a partial perspective view of the electrical connector of FIG. 2, with both the latch and the cover portion hidden.
Figure 6B:
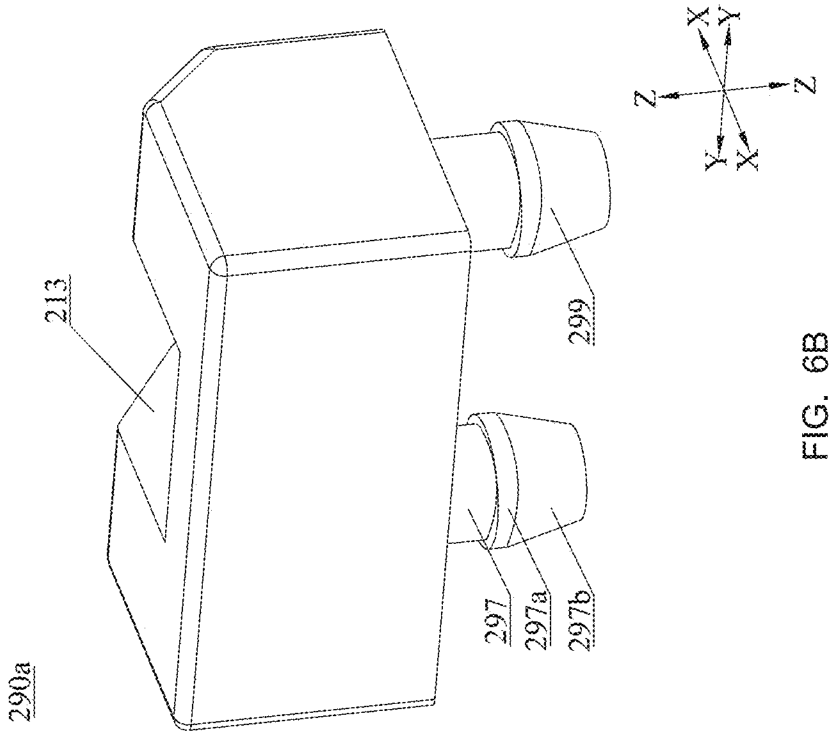
FIGS. 6A-6B are perspective views of the cover portion of FIG. 2.
Figure 6A:
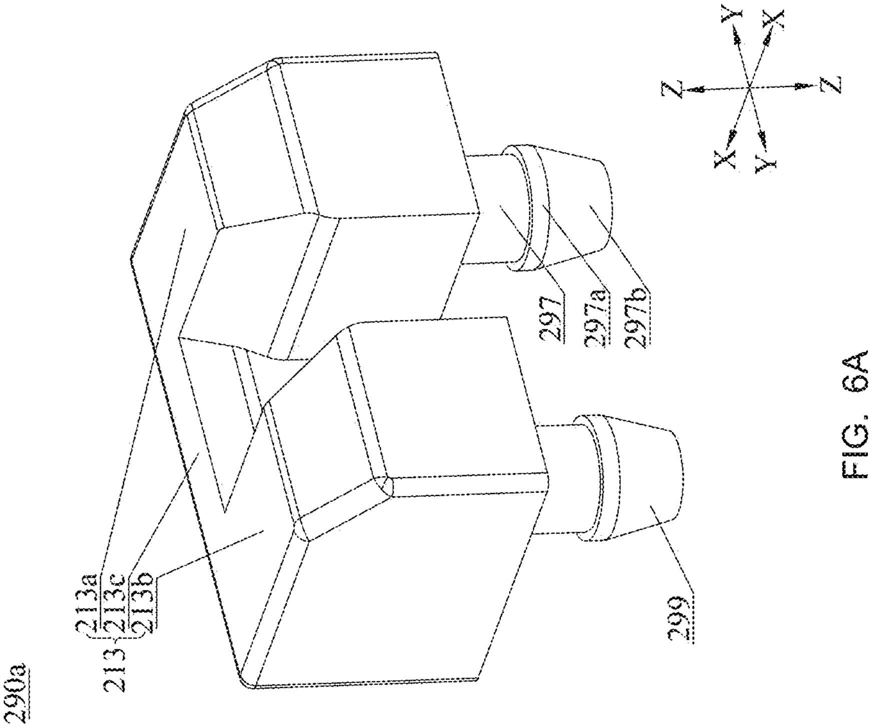

The cover portion 290*a* may be connected to the base portion 270 in any suitable way, such as welding, adhering, or connection by connecting-piece. In some embodiments, as shown in FIGS. 5 and 6A-6B, a first post 297 and a second post 299 may be provided on the cover portion 290*a*. The first post 297 and the second post 299 may be disposed on opposite sides of the slot 210 in the transverse direction Y-Y. A first hole 277 and a second hole 279 may be provided on the base portion 270. The first hole 277 and the second hole 279 may be disposed on opposite sides of the slot 210 in the transverse direction Y-Y. The first post 297 may be inserted into the first hole 277 to engage the first hole 277. The second post 299 may be inserted into the second hole 279 to engage the second hole 279. With this arrangement, the cover portion 290*a* may be easily connected to the base portion 270, with high connection strength. And in the embodiments where the cover portion 290*a* is made of higher strength materials than the insulating housing 200, the first post 297 and the second post 299 can also reinforce a top of the base portion 270 on opposite sides of the slot 210 to reduce the risk of the base portion 270 from splitting to opposite sides under the action of an external force along the transverse direction Y-Y.

In some embodiments, as shown in FIGS. 6A-6B, a ring-shaped protrusion 297*a* may be provided on the outer side wall of the first post 297. The ring-shaped protrusion 297*a* may abut against a wall of the first hole 277 to engage the wall of the first hole 277. By disposing the ring-shaped protrusion 297*a*, material required for the manufacture of the cover portion 290*a* can be reduced, thereby reducing the costs of the electrical connector 100*a*. Moreover, the abutting areas of the cover portion 290*a* and the first hole 277 can be reduced, thereby reducing friction in the process of insertion and facilitating installation; and it can also reduce the possibility of unfitting of abutting surfaces caused by their unevenness, thereby reducing the requirement for processing accuracy. In some embodiments, as shown in FIGS. 6A-6B, a reduced portion 297*b* may be provided on a bottom of the first post 297. The diameter of the reduced portion 297*b* may be gradually reduced. The reduced portion 297*b* may act as a guide to facilitate insertion of the first post 297 into the first hole 277. The second post 299 may have the same structure as the first post 297 or, a different structure from the first post 297.

The cover portion 290*a* and the base portion 270 may form a tower 250 of the electrical connector 100*a*. The tower 250 may meet the specifications of Joint Electron Device Engineering Council (JEDEC). In some embodiments, as shown in FIG. 3, the base portion 270 and the cover portion 290*a* may be disposed sequentially away from the body 230 along the vertical direction Z-Z. The base portion 270 may form the lower portion of the tower 250, and the cover portion 290*a* may form the upper portion of the tower 250. The tower 250 is provided with an up-down separable structure, which can make both portions relatively simple in structure and easy to connect. The slot 210 may extend to the cover portion 290*a* in the vertical direction Z-Z. As illustrated, the slot 210 may include a third portion 213. The third portion 213 may be provided on the cover portion 290*a*. The second portion 212 may connect the first portion 211 and the third portion 213. The third portion 213 may extend from the second portion 212 in the vertical direction Z-Z. Thus, the slot 210 may be substantially U-shaped.

Optionally, the tower 250 may be provided on only one end along the longitudinal direction X-X of the body 230. Optionally, the tower 250 may be provided on opposite ends along the longitudinal direction X-X of the body 230. The tower 250 may be disposed on opposite sides of the body 230 in the longitudinal direction X-X. The tower 250 may serve as a longitudinal end of the insulating housing 200.

In some embodiments, the cover portion 290*a* and the insulating housing 200 may be manufactured separately. Because of structure changes, no weld line which may affect the strength occurs at the weak position of the cover portion 290*a*. In this way, when the electrical connector 100*a* operates under vibration and impact conditions, or the user plugs or unplugs the card 900, the cover portion 290*a* is not easy to crack. The mechanical strength of the whole tower 250 is enhanced. Moreover, the cover portion 290*a* and the insulating housing 200 are manufactured separately, which can reduce manufacturing difficulties of the both, thereby reducing manufacturing costs.

Figure 12:
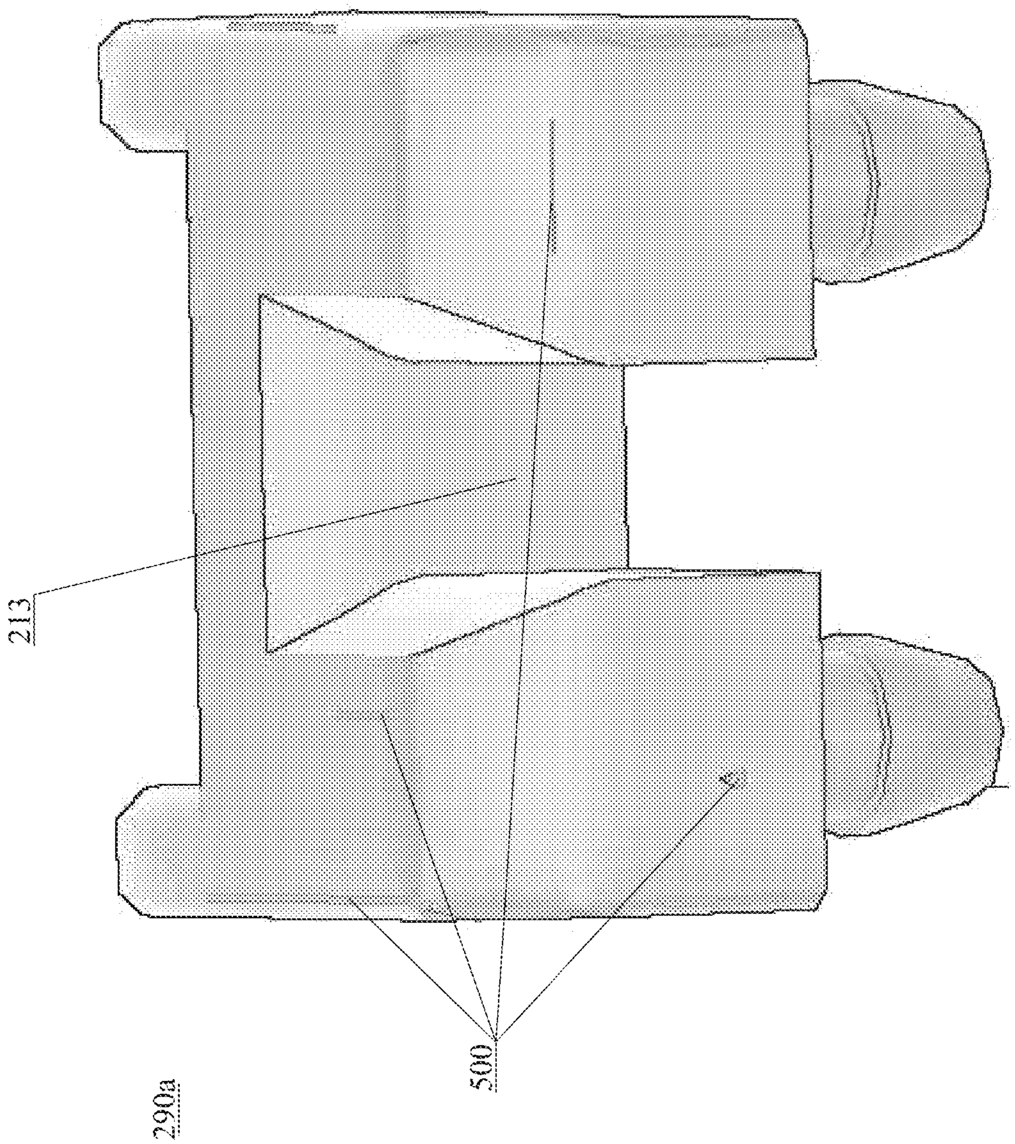
FIG. 12 is a simulated schematic diagram of the cover portion of FIG. 11B, illustrating weld lines.

Based on the reduced manufacturing difficulties, the position of the weld line on the cover portion 290*a* and/or on the insulating housing 200 is more controllable. In the case that the cover portion 290*a* and the insulating housing 200 are both formed with plastic materials and by injection molding process, the manufacturing of the cover portion 290*a* is simulated with moldflow, and the bottom of the third portion 213 (i.e. the thinnest place on the cover portion 290*a*) no longer has a weld line, as shown in FIG. 12. The weld line 500 may be at a position with higher mechanical strength on the cover portion 290*a* and/or on the insulating housing 200. The position with higher mechanical strength is less prone to cracking, thereby inhibiting the negative effect of the weld line 500. Moreover, if a material with higher strength is used or other processes are adopted to manufacture the cover portion 290*a*, it can also have higher strength.

As illustrated, as shown in FIG. 5, the second portion 212 may be enclosed and formed by a first side portion 212*a*, a second side portion 212*b*, and an intermediate portion 212*c*. The first side portion 212*a* and the second side portion 212*b* may be disposed opposite in the transverse direction Y-Y. The intermediate portion 212*c* may connect the sides, close to the longitudinal end of the electrical connector 100*a*, of the first side portion 212*a* and the second side portion 212*b*. Since the second portion 212 of the slot 210 needs to be formed, the thickness of a wall of the intermediate portion 212*c* is thinner than that of the first side portion 212*a* and the second side portion 212*b*. The intermediate portion 212*c* therefore has weaker mechanical strength than the first side portion 212*a* and the second side portion 212*b*. By manufacturing the base portion 270 by injection molding, it is possible to keep the weld line from being located on the intermediate portion 212*c*. In some embodiments, no weld line caused by injection molding is formed on the intermediate portion 212*c*. The weld line may be on the first side portion 212*a* and/or the second side portion 212*b*. In this way, the mechanical strength of the intermediate portion 212*c* will not be further reduced because of the weld line. Moreover, the first side portion 212*a* and/or the second side portion 212*b* can inhibit the negative effect of the weld line.

As shown in FIG. 6A, the third portion 213 of the slot 210 may be enclosed and formed by the first side portion 213*a*, the second side portion 213*b*, and the intermediate portion 213*c*. The first side portion 213*a* and the second side portion 213*b* may be disposed opposite along the transverse direction Y-Y. The intermediate portion 213*c* may connect the sides, close to the longitudinal end of the electrical connector 100*a*, of the first side portion 213*a* and the second side portion 213*b*. Since the third portion 213 of the slot 210 needs to be formed, the thickness of the wall of the intermediate portion 213*c* is much thinner than that of the first side portion 213*a* and the second side portion 213*b*. The intermediate portion 213*c* therefore has weaker mechanical strength than the first side portion 213*a* and the second side portion 213*b*. By manufacturing the cover portion 290*a* by injection molding, it is possible to keep the weld line from being located on the intermediate portion 213*c*. In some embodiments, no weld line caused by injection molding is formed on the intermediate portion 213*c*. The weld line may be on the first side portion 213*a* and/or the second side portion 213*b*. In this way, the mechanical strength of the intermediate portion 213*c* will not be further reduced because of the weld line. Moreover, the first side portion 213*a* and/or the second side portion 213*b* can inhibit the negative effect of the weld line.

Exemplarily, the mechanical strength of the cover portion 290*a* may be equal to or higher than that of the insulating housing 200. In some embodiments, the cover portion 290*a* may be made of materials with higher mechanical strength such that the cover portion 290*a* is less likely to crack and can provide better support for the insulating housing 200. And, by using different materials, the position of the weld line on the cover portion 290*a* will naturally be different. In this way, without other adjustments, the weld line on the cover portion 290*a* and that on the insulating housing 200 naturally may not be continuous. Further, since the cover portion 290*a* is manufactured separately from the insulating housing 200, it is possible to manufacture the cover portion 290*a* with a process different from the process for manufacturing the insulating housing 200. The manufacturing process of the cover portion 290*a* may relate to its material, and those skilled in the art can choose the manufacturing process of the cover portion 290*a* as needed.

Exemplarily, the material of the cover portion 290*a* may be the same as or different from that of the insulating housing 200. The cover portion 290*a* may be made of one or more from metal, ceramics, polycarbonate (PC), acrylonitrile-butadiene-styrene (ABS) and liquid crystal polymer (LCP). The above materials have high mechanical strength and low costs, and the cover portion 290*a* made of the above materials can extend the service life of the electrical connector 100*a*.

Exemplarily, as shown in FIGS. 1-2, 4 and 7, the electrical connector 100*a* may include a latch 400. The latch 400 may be pivotally connected to the base portion 270 between a locked position and an unlocked position. In the embodiments as shown in the drawings, a pivot 490 may be provided on the latch 400 (see FIG. 7) and pivot holes 203 may be provided on the base portion 270 (see FIG. 5). By inserting the pivot 490 into the pivot holes 203, the latch 400 may pivot relative to the base portion 270. The latches 400 may be disposed in pairs. The latches 400 in pairs may be connected to opposite ends of the insulating housing 200, respectively. The latch 400 may be formed by molding process and using insulating materials, such as plastics. The latch 400 is usually an integrated piece. The material of the latch 400 may be the same as or different from that of the insulating housing 200. The latch 400 may be used to lock and release the card 900 that is inserted into the slot 210.

Figure 7:
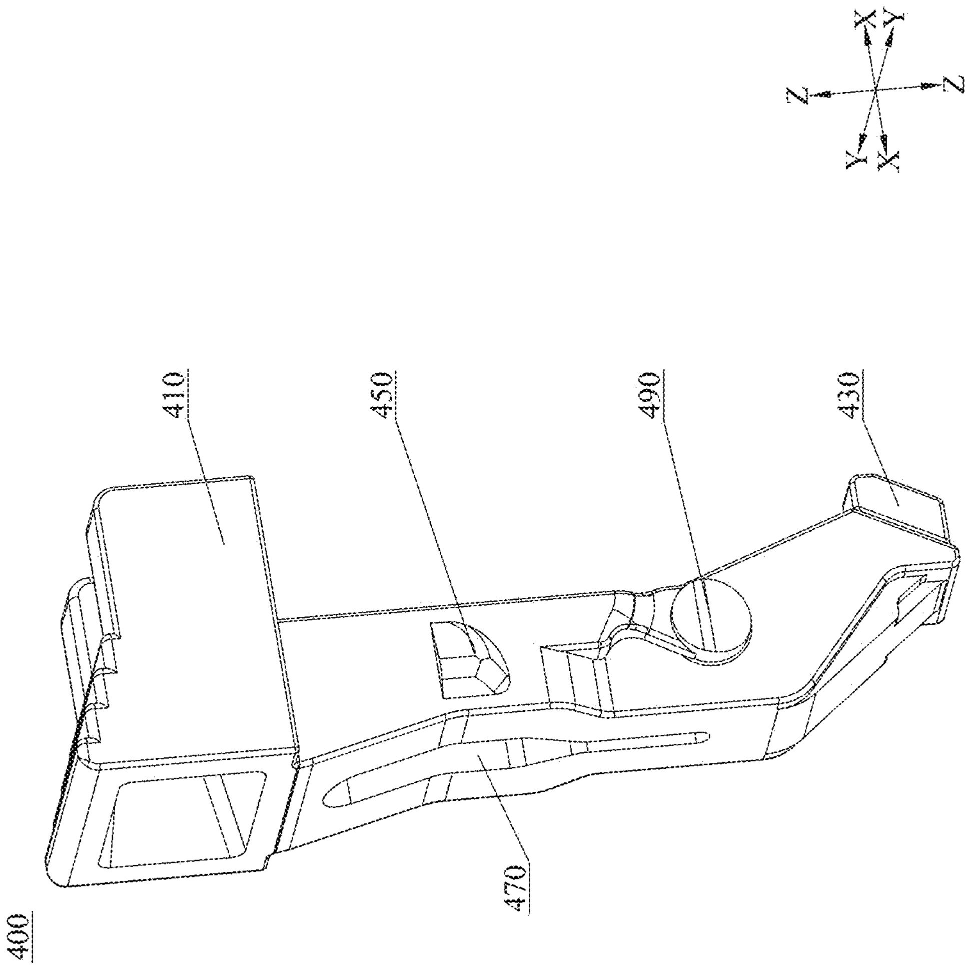
FIG. 7 is a perspective view of the latch of the electrical connector of FIG. 2.

As shown in FIG. 7, the latch 400 may have a head portion 410 and a tail portion 430 disposed opposite in the vertical direction Z-Z. When the latch 400 is in the locked position, a transverse bar of the head portion 410 may be inserted into a gap on the card 900, thereby engaging the edge of the gap, so that the latch 400 may lock/secure the card 900 to the insulating housing 200. The head portion 410 may have one or more of: non-slip stripes, grooves and steps. The head portion 410 helps the user to pivot the latch 400 between the locked position and the unlocked position.

When the latch 400 is unlocked, the latch 400 pivots outward, and the transverse bar may exit the gap on the card 900. In the process of the latch 400 pivoting outward to the unlocked position, the tail portion 430 may move toward the mating face 201, thereby abutting against the edge of the card 900 to lift the card 900 in the slot 210 up. Thus, the card 900 may be released from the insulating housing 200.

Exemplarily, as shown in FIG. 4, the latch 400 may be configured to engage the base portion 270 when it is at the locked position. In this way, the base portion 270 may play a role of limiting the latch 400. As shown in FIGS. 3-4, a cavity 271 may be provided on the base portion 270. The cover portion 290*a* may be connected to a part of the base portion 270 close to the body 230. When the latch 400 is at the locked position, the lower portion of the latch 400 may be accommodated in the cavity 271; and the upper portion of the latch 400 may abut against the cover portion 290*a*.

Exemplarily, as shown in FIG. 7, a locking protrusion 450 may be provided on opposite sides of the latch 400 in the transverse direction Y-Y. As shown in FIG. 5, a recess 273 may be provided on an inner wall of the cavity 271. When the latch 400 is at the locked position, the locking protrusion 450 may engage the recess 273. In this way, the base portion 270 may act better for limiting the latch 400, thereby enabling the latch 400 to apply a stronger holding force on the card 900.

Exemplarily, as shown in FIG. 4, the cover portion 290*a* may be connected to a connecting surface 275 of the base portion 270. The recess 273 may extend to the connecting surface 275. Thus, the insulating housing 200 may be easily manufactured with injection molding process. Exemplarily, as shown in FIG. 5, the connecting surface 275 may be perpendicular to the vertical direction Z-Z. The connecting surface 275 is a flat surface and is formed as a top surface of the base portion 270. Thus, a bottom surface of the cover portion 290*a* that is adaptable to the connecting surface 275 may also be processed to a flat surface in order to facilitate the processing of the cover portion 290*a* and the base portion 270.

Figure 2:
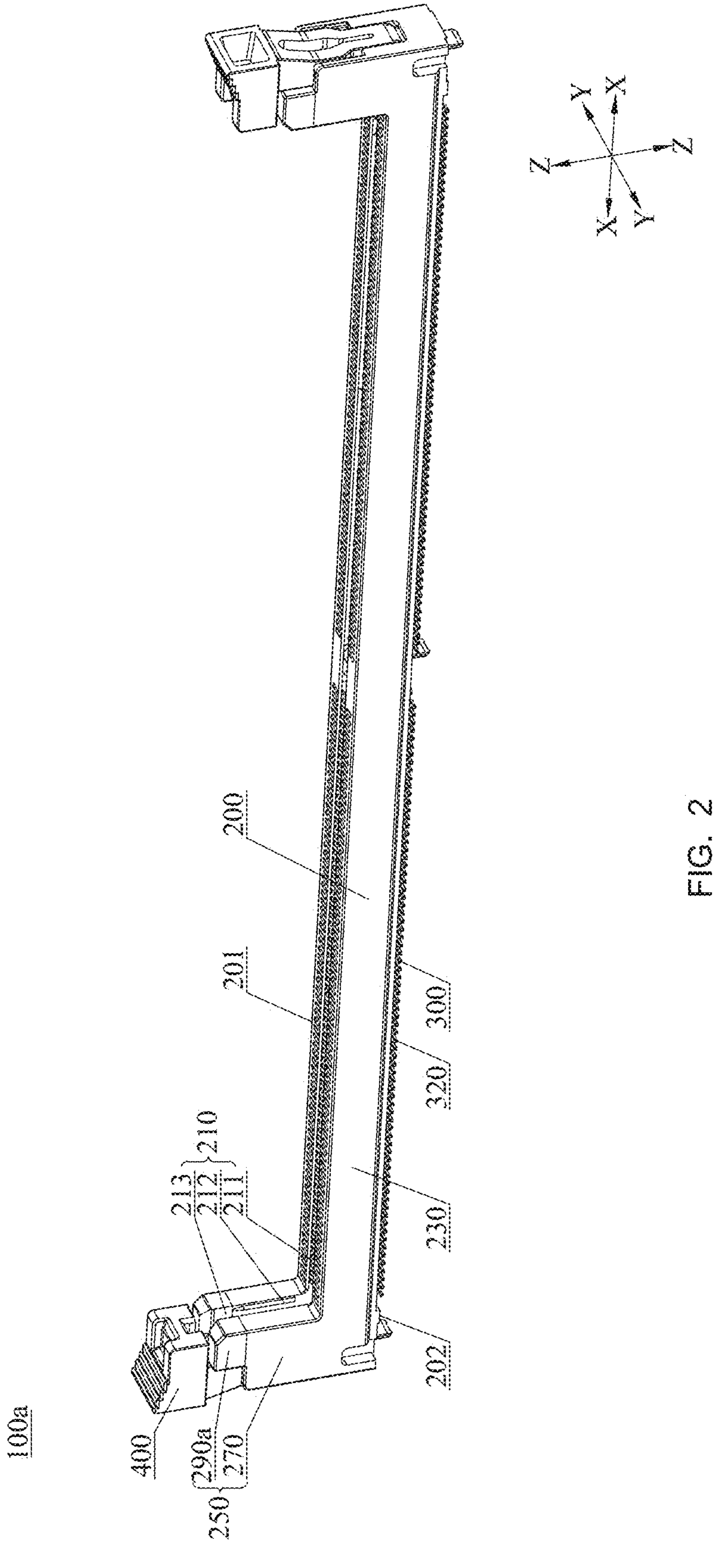
FIG. 2 is a perspective view of the electrical connector of the electronic system of FIG. 1, according to some embodiments.

Exemplarily, as shown in FIG. 2, when the latch 400 is at the locked position, the cover portion 290*a* may be within a space at least partially surrounded by the latch 400 and the base portion 270. As illustrated, along the longitudinal direction X-X, the cover portion 290*a* may be disposed at the inner side of the latch 400 at the locked position. Along the vertical direction Z-Z, the cover portion 290*a* may be disposed at the upper side of the base portion 270. In the process of pivoting, the latch 400 may not contact the cover portion 290*a*. With such an arrangement, the cover portion 290*a* may not obstruct the latch 400 from pivoting, improving tolerance for the machining accuracy requirements for the cover portion 290*a* and the latch 400.

Exemplarily, a restraining feature may be disposed on the cover portion. When the latch 400 is at the locked position, the restraining feature may engage the latch 400 in the transverse direction Y-Y. The restraining feature includes a baffle or a buckle. The restraining feature can increase the mechanical strength of the latch 400 in the transverse direction Y-Y, thereby reducing the risk of shaking the latch 400 in field.

Exemplarily, as shown in FIG. 7, a heat dissipation hole 470 extending in the longitudinal direction X-X may be provided on the latch 400. The heat dissipation hole 470 may be aligned with the slot 210. With the increasing data processing speed, more heat is generated when electronic systems run. However, the circuits on the mainboard are getting more and more intensive, and the gap between the adjacent electrical connectors is very small or there is almost no gap, thus it is disadvantage for heat dissipation. In particular, multiple electrical connectors are typically arranged side by side along the transverse direction Y-Y on the mainboard and closely adjacent, thus the heat dissipation mainly depends on ventilation along the longitudinal direction X-X. In this case, it is better that the heat dissipation hole 470 is larger, but the mechanical strength of the latch 400 will inevitably be reduced.

Figure 8:
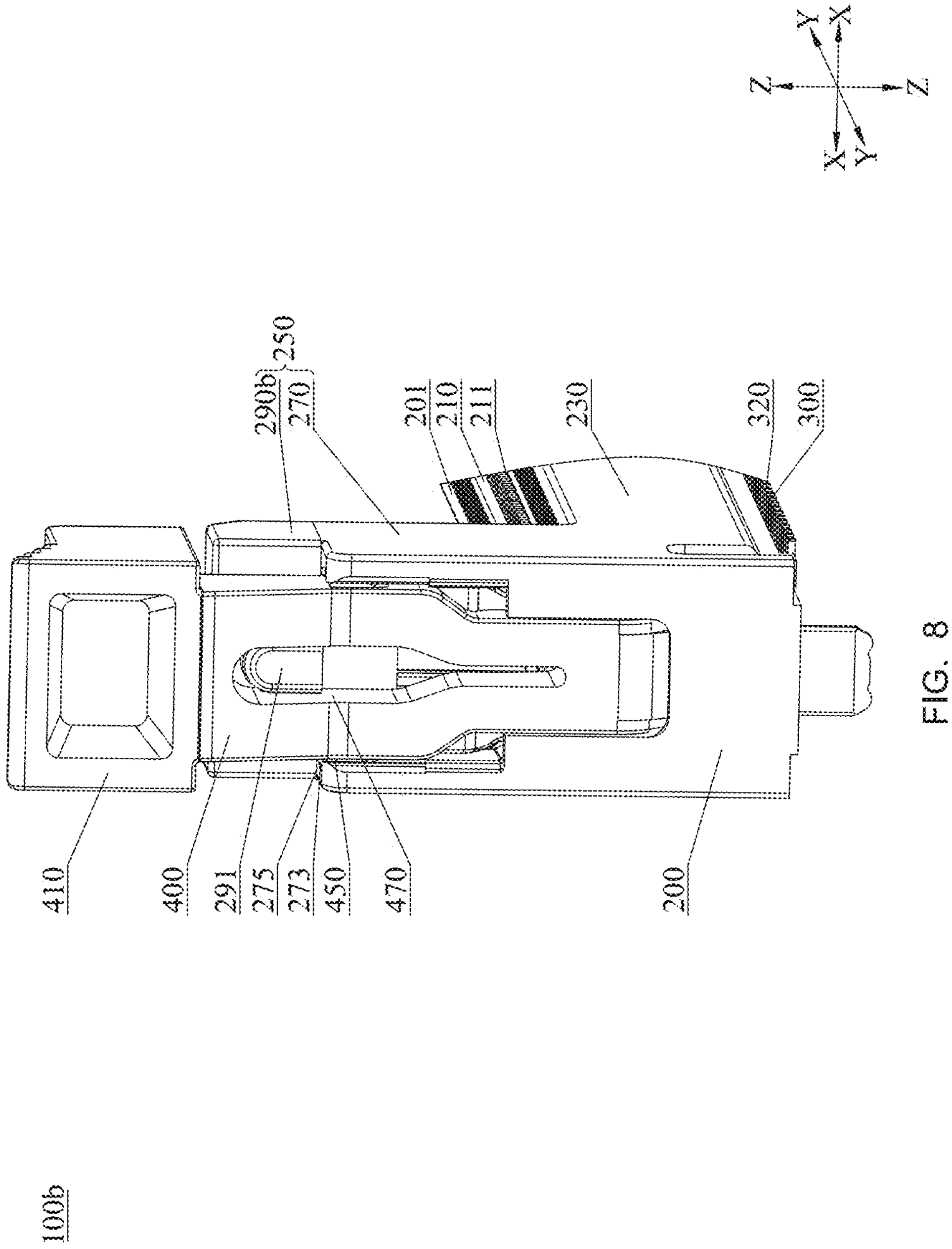
FIG. 8 is a partial perspective view of an electrical connector, according to some embodiments.
Figure 9B:
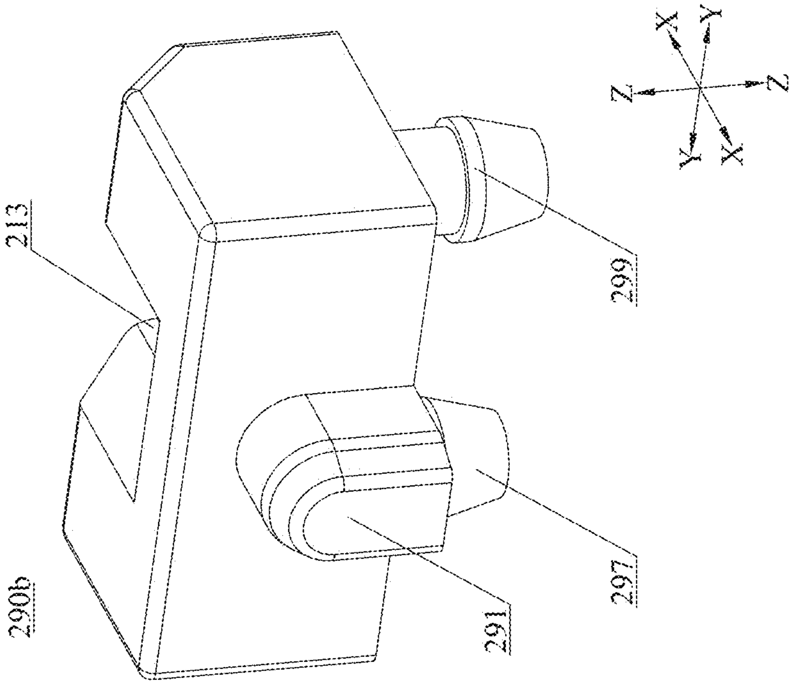
FIGS. 9A-9B are perspective views of a cover portion of the electrical connector of FIG. 8.
Figure 9A:
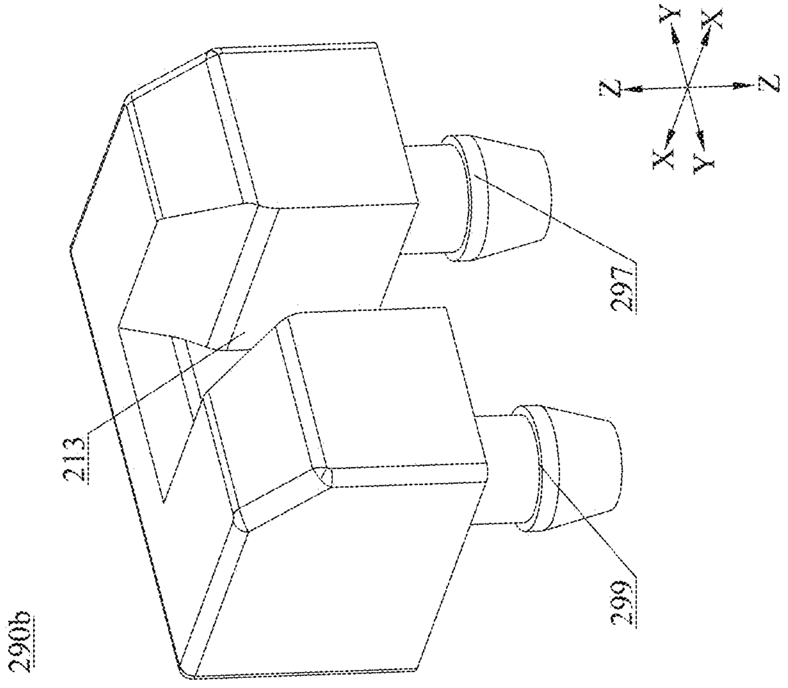

Based on this, FIGS. 8 and 9A-9B illustrate an electrical connector 100*b*, according to some embodiments. As shown in FIGS. 9A-9B, the electrical connector 100*b* may include a cover portion 290*b* configured with suitable features of the cover portion 290*a* of the electrical connector 100*a*. A restraining protrusion 291 may be provided on the cover portion 290*b* of the electrical connector 100*b*. The restraining feature may include the restraining protrusion 291. The restraining protrusion 291 may protrude outward from the cover portion 290*b* along the longitudinal direction X-X. The same or similar parts of the electrical connector 100*b* and the electrical connector 100*a* may be marked with the same or similar reference numerals, and for the sake of simplicity, no further details will be described here. As shown in FIG. 8, when the latch 400 is at the locked position, the restraining protrusion 291 may engage the heat dissipation hole 470 along the transverse direction Y-Y. Thus, the restraining protrusion 291 can improve the mechanical strength of the latch 400, thereby inhibiting the latch 400 from shaking.

Figure 10:
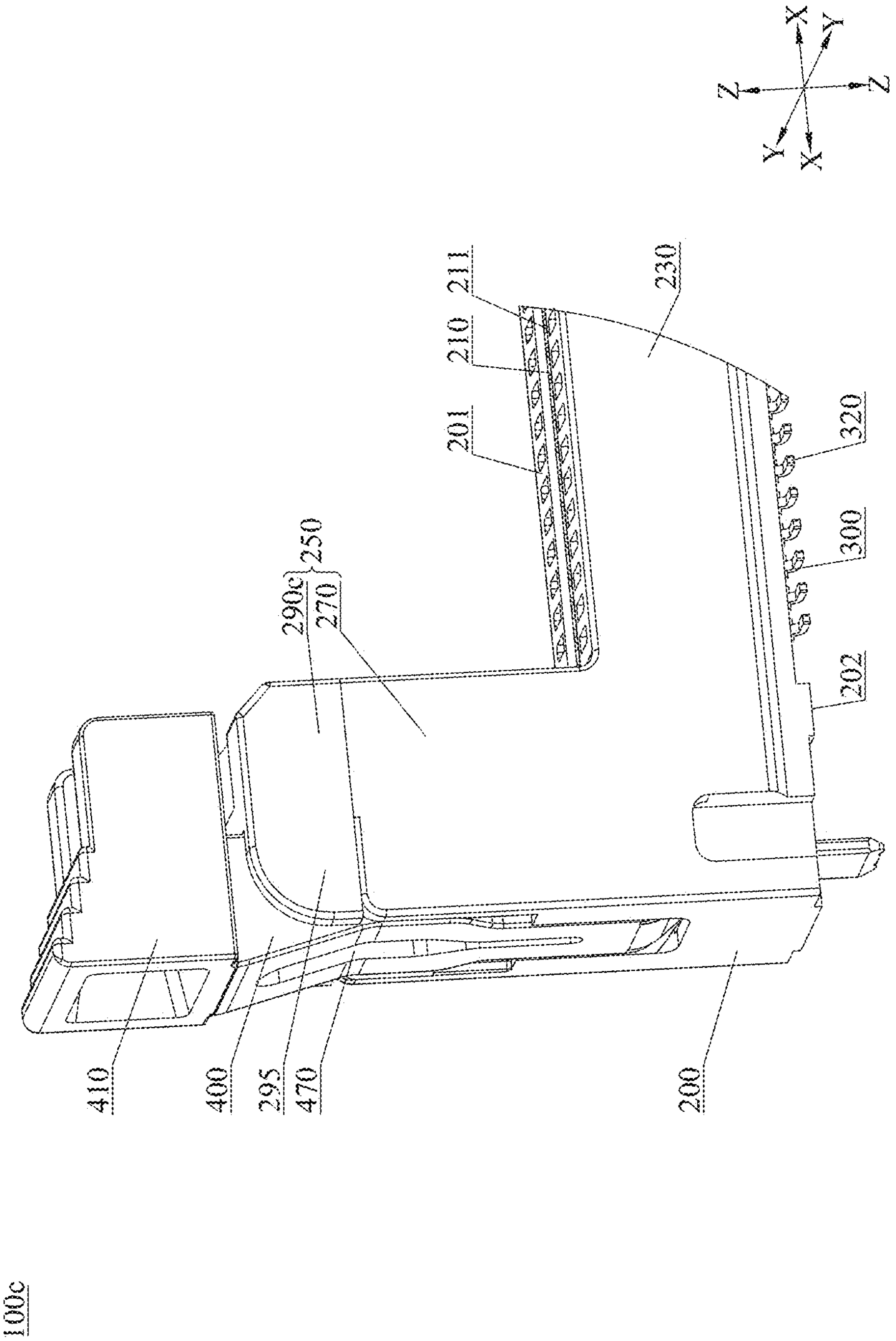
FIG. 10 is a partial perspective view of an electrical connector, according to some embodiments.
Figure 11B:
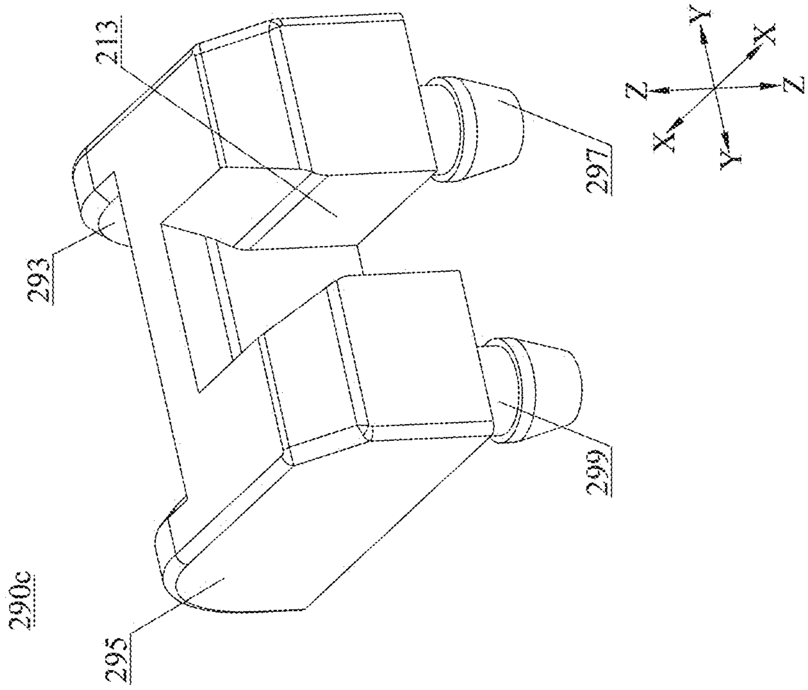
FIGS. 11A-11B are perspective views of a cover portion of the electrical connector of FIG. 10.
Figure 11A:
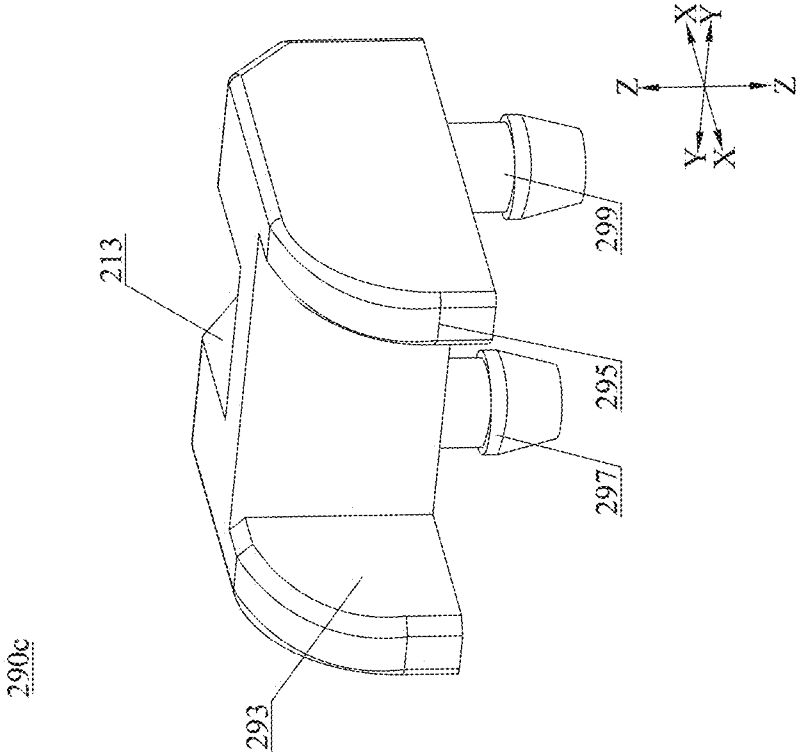

FIGS. 10 and 11A-11B illustrate an electrical connector 100*c*, according to some embodiments. As shown in FIGS. 11A-11B, the electrical connector 100*c* may include a cover portion 290*c* configured with suitable features of the cover portion 290*a* of the electrical connector 100*a*. A first tab 293 and a second tab 295 may be provided on a cover portion 290*c* of the electrical connector 100*c*. The restraining feature may include the first tab 293 and the second tab 295. The first tab 293 and the second tab 295 may protrude outward from opposite sides of the cover portion 290*c* in the longitudinal direction X-X. The same or similar parts of the electrical connector 100*c* and the electrical connector 100*a* may be marked with the same or similar reference numerals, and for the sake of simplicity, no further details will be described here. When the latch 400 is at the locked position, the first tab 293 and the second tab 295 may clamp the latch 400 therebetween along the transverse direction Y-Y. In this way, the first tab 293 and the second tab 295 can improve the mechanical strength of the latch 400, thereby inhibiting the latch 400 from shaking.

The present disclosure has been described through the above embodiments, but it should be understood that a variety of variations and modifications may be made according to the teaching of the present disclosure by those skilled in the art, and these variations and modifications all fall within the scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

In the description of the present disclosure, it is to be understood that orientation or positional relationships indicated by orientation words “front”, “rear”, “upper”, “lower”, “left”, “right”, “transverse direction”, “vertical direction”, “perpendicular”, “horizontal”, “top”, “bottom” and the like usually are shown based on the accompanying drawings, for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words “inside” and “outside” refer to the inside and outside relative to the contour of each component itself.

Various variations may be made to the structures illustrated and described herein. For example, The base portion and the cover portion described above can be used in any suitable electrical connector, such as backplane connectors, daughtercard connectors, stacking connectors, Mezzanine connectors, I/O connectors, chip sockets, Gen Z connectors, etc. The base portion and the cover portion can improve the mechanical properties of these connectors and improve the stability of the connection with respective mating components.

Moreover, although many inventive aspects have been described above with reference to vertical connectors, it should be understood that the aspects of the present disclosure are not limited to these. Any one of the inventive features, whether alone or combined with one or more other creative features, can also be used in other types of electrical connectors, such as coplanar connectors, orthogonal connectors and right angle connectors, etc.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are for describing specific embodiments, and may not be intended to limit the exemplary embodiments. As used herein, an expression of a singular form includes an expression of a plural form unless otherwise indicated. In addition, the use of "including", "comprising", "having", "containing", or "involving", and variations thereof herein, is meant to encompass the items listed thereafter (or equivalents thereof) and/or as additional items.

In the claims, as well as in the specification above, use of ordinal terms such as "first," "second," "third," etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An electrical connector comprising:

a housing comprising a body having a mating face and a mounting face opposite the mating face, a base portion extending from an end of the body, a first portion of a slot extending in the body from the mating face toward the mounting face, and a second portion of the slot extending in the base portion;

a latch pivotably connected to the base portion of the housing between a locked position and an unlocked position; and a cover portion disposed on the base portion of the housing, the cover portion comprising one or more posts extending into the base portion, wherein:

the slot comprises a third portion extending into the cover portion, and the second portion of the slot connects the first portion and the third portion.

2. The electrical connector of claim 1, wherein:

the cover portion is at least partially surrounded by the base portion of the housing and the latch when the latch is in the locked position.

3. The electrical connector of claim 1, wherein:

the cover portion comprises a restraining feature configured to engage the latch when the latch is in the locked position.

4. The electrical connector of claim 3, wherein:

the latch comprises a hole extending therethrough; and the restraining feature of the cover portion comprises a protrusion configured to extend into the hole of the latch when the latch is in the locked position.

5. The electrical connector of claim 3, wherein:

the restraining feature of the cover portion comprises a first tab and a second tab extending from opposite sides of the cover portion and away from the third portion of the slot; and the latch is disposed between the first tab and the second tab when the latch is in the locked position.

6. The electrical connector of claim 1, wherein:

the base portion of the housing comprises a first hole and a second hole disposed on opposite sides of the second portion of the slot; and the one or more posts of the cover portion comprises a first post and a second post extending from opposite sides of the third portion of the slot, the first post extending into the first hole, and the second post extending into the second hole.

7. The electrical connector of claim 1, comprising:

a plurality of conductive elements, each of the plurality of conductive elements comprising a mating portion curving into the first portion of the slot and a mounting portion extending out of the mounting face of the housing.

8. An electrical connector comprising:

a housing body comprising a mating face and a mounting face opposite the mating face;

a slot extending in the housing body;

a plurality of conductive elements held by the housing body, each of the plurality of conductive elements comprising a mating portion curving into the slot and a mounting portion extending out of the mounting face; and a tower extending from an end of the housing body, the tower comprising a base portion having a surface and a cover portion engaging the surface of the base portion.

9. The electrical connector of claim 8, wherein:

the slot extends from the housing body through the base portion of the tower to the cover portion of the tower.

10. The electrical connector of claim 8, comprising:

a latch pivotably connected to the base portion of the tower between a locked position and an unlocked position, the latch comprising a head portion configured to engage a card inserted into the slot when the latch is in the locked position, and a tail portion opposite the head portion and configured to move toward the mating face when the latch pivots from the locked position to the unlocked position, wherein the cover portion of the tower is disposed between the head portion of the latch and the base portion of the tower.

11. The electrical connector of claim 10, wherein:

the base portion of the tower comprises a cavity; and the latch comprises an intermediate portion joining the head portion and the tail portion and configured to be disposed in the cavity of the base portion of the tower when the latch is in the locked position.

12. The electrical connector of claim 11, wherein:

the base portion of the tower comprises a recess extending into a wall of the cavity and up to the surface that the cover portion engages; and the intermediate portion of the latch comprises a protrusion configured to extend into the recess when the latch is in the locked position.

13. The electrical connector of claim 8, wherein:

the base portion of the tower comprises a hole extending from the surface that the cover portion engages toward the housing body; and the cover portion of the tower comprises a post extending into the hole of the base portion of the tower.

14. The electrical connector of claim 13, wherein:

the post of the cover portion of the tower comprises a ring-shaped protrusion, a guide portion tapering from the ring-shaped protrusion to a distal end, and a reduced portion separated from the guide portion by the ring-shaped protrusion.

15. A method of manufacturing an electrical connector comprising:

forming a housing comprising a body having a mating face and a mounting face opposite the mating face, a base portion extending from an end of the body, a first portion of a slot extending in the body from the mating face toward the mounting face, and a second portion of the slot extending in the base portion;

forming, separately from forming the housing, a cover portion comprising a third portion of the slot; and disposing the cover portion on the base portion of the housing.

16. The method of claim 15, comprising:

pivotably connecting a latch to the base portion of the housing between a locked position and an unlocked position.

17. The method of claim 15, wherein:

forming the housing comprises molding the housing with an insulative material.

18. The method of claim 17, wherein:

forming the cover portion comprises molding the cover portion with the insulative material.

19. The method of claim 17, wherein:

the cover portion is formed with a material different from the insulative material.

20. The method of claim 19, wherein:

the material of the cover portion has a higher mechanical strength than the insulative material.

* * * * *